United States Patent
Kanda (10) Patent No.: US 7,486,838 B2
(45) Date of Patent: Feb. 3, 2009

(54) NOISE REDUCTION APPARATUS

(75) Inventor: Yamato Kanda, Hino (JP)

(73) Assignee: Olympus Corporation, Tokyo (JP)

( * ) Notice: Subject to any disclaimer, the term of this patent is extended or adjusted under 35 U.S.C. 154(b) by 490 days.

(21) Appl. No.: 11/225,583

(22) Filed: Sep. 13, 2005

(65) Prior Publication Data

US 2006/0204126 A1 Sep. 14, 2006

(30) Foreign Application Priority Data

Sep. 17, 2004 (JP) ............................ 2004-272273

(51) Int. Cl.
*G06K 9/40* (2006.01)

(52) U.S. Cl. ................... 382/275; 382/274; 382/308; 358/3.26; 358/3.27

(58) Field of Classification Search ................ 382/260, 382/274, 275, 282, 208; 358/3.26, 3.27, 358/463

See application file for complete search history.

(56) References Cited

U.S. PATENT DOCUMENTS

| 5,231,485 | A | * | 7/1993 | Israelsen et al. | ........ 375/240.03 |
|---|---|---|---|---|---|
| 5,424,730 | A | * | 6/1995 | Sasaki et al. | ................... 341/25 |
| 5,844,627 | A | * | 12/1998 | May et al. | ................... 348/607 |
| 6,449,384 | B2 | * | 9/2002 | Laumeyer et al. | ........... 382/104 |
| 6,456,324 | B1 | * | 9/2002 | Yamada et al. | ........... 348/219.1 |
| 6,611,241 | B1 | * | 8/2003 | Firester et al. | ................ 345/1.3 |
| 6,757,442 | B1 | * | 6/2004 | Avinash | ...................... 382/274 |
| 6,817,982 | B2 | * | 11/2004 | Fritz et al. | ................... 600/443 |
| 6,907,144 | B1 | * | 6/2005 | Gindele | ....................... 382/275 |
| 6,980,254 | B1 | * | 12/2005 | Nishihashi et al. | ......... 348/452 |
| 7,092,548 | B2 | * | 8/2006 | Laumeyer et al. | ........... 382/104 |
| 7,110,612 | B1 | * | 9/2006 | Wang | ......................... 382/262 |

FOREIGN PATENT DOCUMENTS

| JP | 2001-157057 A | 6/2001 |
|---|---|---|
| JP | 2002-247412 A | 8/2002 |

* cited by examiner

*Primary Examiner*—Yosef Kassa
(74) *Attorney, Agent, or Firm*—Frishauf, Holtz, Goodman & Chick, P.C.

(57) ABSTRACT

A noise reduction apparatus is disclosed. A noise amount estimating unit estimates a noise amount in a focused pixel. A smoothing unit smoothes the focused pixel. A control unit controls the smoothing unit on the basis of the noise amount and information on the focused pixel and neighboring pixels thereof.

12 Claims, 8 Drawing Sheets

···Filter arrangement

FIG. 4

Focused pixel

| P0 | P1 | P2 |
|----|----|----|
| P3 | P4 | P5 |
| P6 | P7 | P8 |

| 1/16 | 2/16 | 1/16 |
|------|------|------|
| 2/16 | 4/16 | 2/16 |
| 1/16 | 2/16 | 1/16 |

Px:signal value   Additional coefficient

Signal value level = (P4*4+(P1+P3+P5+P7)*2+P0+P2+P6+P8)/16

NOISE REDUCTION APPARATUS

CROSS-REFERENCE TO RELATED APPLICATIONS

This application is based upon and claims the benefit of priority from prior Japanese Patent Application No. 2004-272273, filed Sep. 17, 2004, the entire contents of which are incorporated herein by reference.

BACKGROUND OF THE INVENTION

1. Field of the Invention

The present invention relates to a noise reduction apparatus which reduces noise in an image signal.

2. Description of the Related Art

Noise reduction apparatuses for image signals can be found in, for example, Jpn. Pat. Appln. KOKAI Publication No. 2001-157057 and Jpn. Pat. Appln. KOKAI Publication No. 2002-247412. Jpn. Pat. Appln. KOKAI Publication No. 2001-157057 discloses an apparatus wherein a noise amount is converted into a function with respect to a signal level, and the frequency characteristic of filtering is controlled in accordance with the noise amount estimated on the basis of this function, thereby performing noise reduction processing adaptive to the signal level. Further, Jpn. Pat. Appln. KOKAI Publication No. 2002-247412 discloses an apparatus wherein a focused pixel is classified into an original image signal component (hereinafter referred to as an original signal), a noise component and an uncertain component on the basis of signal values of the focused pixel and neighboring pixels thereof, and different kinds of processing are performed for the respective components, thereby reducing noise while restraining deterioration of the original signal.

BRIEF SUMMARY OF THE INVENTION

According to a first aspect of the present invention, a noise reduction apparatus comprises a noise amount estimating unit which estimates a noise amount in a focused pixel; a smoothing unit which smoothes the focused pixel; and a control unit which controls the smoothing unit on the basis of the noise amount and information on the focused pixel and neighboring pixels thereof.

According to a second aspect of the present invention associated with the first aspect, the smoothing unit preferably has a filtering section which adds/averages signal values of the focused pixel and the neighboring pixels, and the control unit has a coefficient setting section which sets a filter coefficient for use in the filtering section on the basis of the noise amount and a signal value difference between the focused pixel and the neighboring pixels.

According to a third aspect of the present invention associated with the second aspect, the coefficient setting section preferably has a coefficient calculator which calculates the filter coefficient for the neighboring pixels except for the focused pixel as an increasing function relative to the noise amount.

According to a fourth aspect of the present invention associated with the second aspect, the coefficient setting section preferably has a coefficient calculator which calculates the filter coefficient for the neighboring pixels except for the focused pixel as a decreasing function relative to the signal value difference between the focused pixel and the neighboring pixels.

According to a fifth aspect of the present invention associated with the first aspect, the control unit has a judging section which judges whether an area in the vicinity of the focused pixel is a flat portion or an edge portion on the basis of the noise amount, and the smoothing unit has a flat portion processing section which performs processing when the area in the vicinity of the focused pixel is judged to be the flat portion by the judging section, and an edge portion processing section which performs processing when the area in the vicinity of the focused pixel is judged to be the edge portion by the judging section.

According to a sixth aspect of the present invention associated with the fifth aspect, the edge portion processing section preferably has an analogous pixel detector which detects the neighboring pixel whose signal value is analogous to that of the focused pixel on the basis of the noise amount, and an inter-analogous-pixel processor which performs processing by use of the signal values of the analogous pixel and the focused pixel.

According to a seventh aspect of the present invention associated with the first aspect, the noise amount estimating unit has a signal value level calculating section which calculates a signal value level for noise estimation in the focused pixel by use of the signal values of the focused pixel and the neighboring pixels thereof.

According to an eighth aspect of the present invention associated with the seventh aspect, the noise amount estimating unit has a temperature measuring section which measures a temperature of an image pickup device, and uses the temperature of the image pickup device to calculate the signal value level for noise estimation in the focused pixel.

According to a ninth aspect of the present invention associated with the seventh aspect, the noise amount estimating unit has an OB dispersion calculating section which obtains dispersion of signals of an optical black (OB) area within the image pickup device, and a temperature estimating section which estimates the temperature of the image pickup device from the dispersion, and the noise amount estimating unit uses the estimated temperature of the image pickup device to calculate the signal value level for noise estimation in the focused pixel.

According to a tenth aspect of the present invention associated with the seventh aspect, the noise amount estimating unit has a gain information obtaining section which obtain gain information relative to an imaging signal, and uses the gain information to calculate the signal value level for noise estimation in the focused pixel.

According to an eleventh aspect of the present invention associated with the first aspect, the noise reduction apparatus preferably further comprises a directionality judging unit which judges a level of directionality in the vicinity of the focused pixel, and the control unit further controls the smoothing unit on the basis of the level of directionality.

According to a twelfth aspect of the present invention associated with the first aspect, the noise reduction apparatus preferably further comprises a particular color judging unit which judges whether or not the area in the vicinity of the focused pixel has a particular color, and the control unit further controls the smoothing unit on the basis of information on the particular color.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will hereinafter be described in detail with reference to the drawings. In the present embodiment, a noise reduction apparatus in a digital photographic instrument (hereinafter simply referred to as a photographic instrument) will be shown, but the present invention is also applicable to other instruments handling digital image signals containing noise.

First Embodiment

Figure 1:
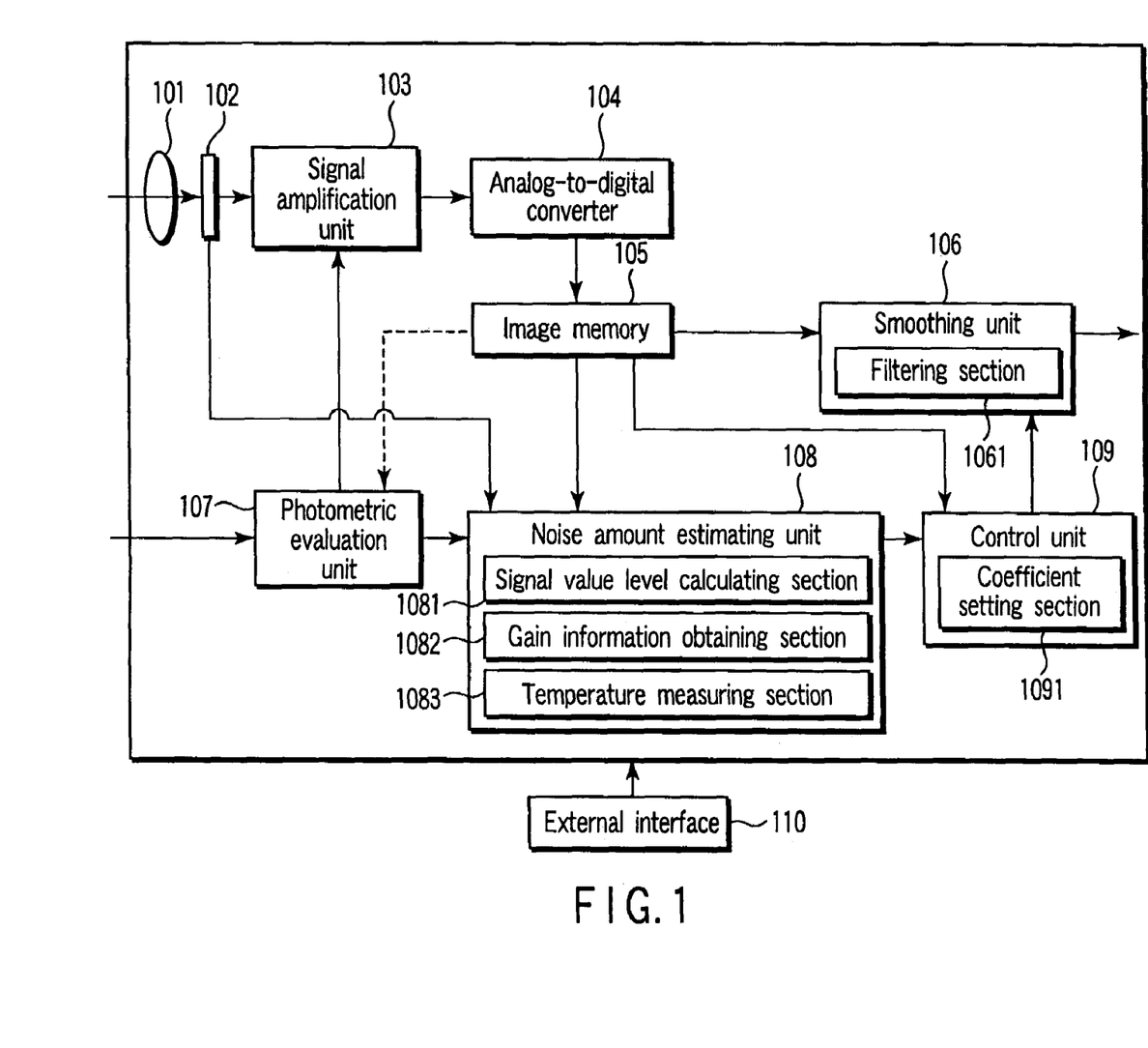
FIG. 1 is a diagram showing a configuration of a noise reduction apparatus according to a first embodiment of the present invention.

FIG. 1 is a diagram showing a configuration of a noise reduction apparatus according to a first embodiment of the present invention. It is to be noted that in a photographic instrument, various kinds of signal processing are performed after a smoothing unit 106 in the drawing to output or record a final image. However, a configuration for such processing is not specifically limited in the present invention, and is therefore not shown. Moreover, a memory used for calculation and the like in each unit is not specifically shown either.

Now, the configuration will be described below. The noise reduction apparatus according to the first embodiment comprises an optical system 101 which forms an image of a subject; an image pickup device 102 which converts the formed image into an analog electrical signal; a signal amplification unit 103 which amplifies the analog electrical signal; an analog-to-digital converter 104 which digitizes the amplified signal; an image memory 105 which captures the digital signal as image information; a photometric evaluation unit 107 which calculates a gain in the signal amplification unit 103 in accordance with a condition of external light during photographing and with set contents of an external interface 110; a noise amount estimating unit 108 which estimates a noise amount in an optional pixel from the gain, a temperature of the image pickup device and image information; the smoothing unit 106 which smoothes the image to reduce noise; a control unit 109 which controls the smoothing in the smoothing unit 106 on the basis of the noise amount and the image information; the external interface 110 which sets an ISO film speed, an exposure condition, an aperture, a shutter speed, a scene to be imaged and the like and which instructs on photographing; and various kinds of image processing units and an output unit at subsequent stages which are not shown.

Furthermore, the noise amount estimating unit 108 includes a signal value level calculating section 1081 which calculates a signal value level in the vicinity of a focused pixel; a gain information obtaining section 1082 which obtains information on the gain calculated in the photometric evaluation unit 107; and a temperature measuring section 1083 which measures a temperature of the image pickup device. Moreover, the smoothing unit 106 includes a filtering section 1061 which performs addition/averaging for the focused pixel and neighboring pixels. Further, the control unit 109 includes a coefficient setting section 1091 which sets a filter coefficient for use in the filtering section 1061.

Figure 2:
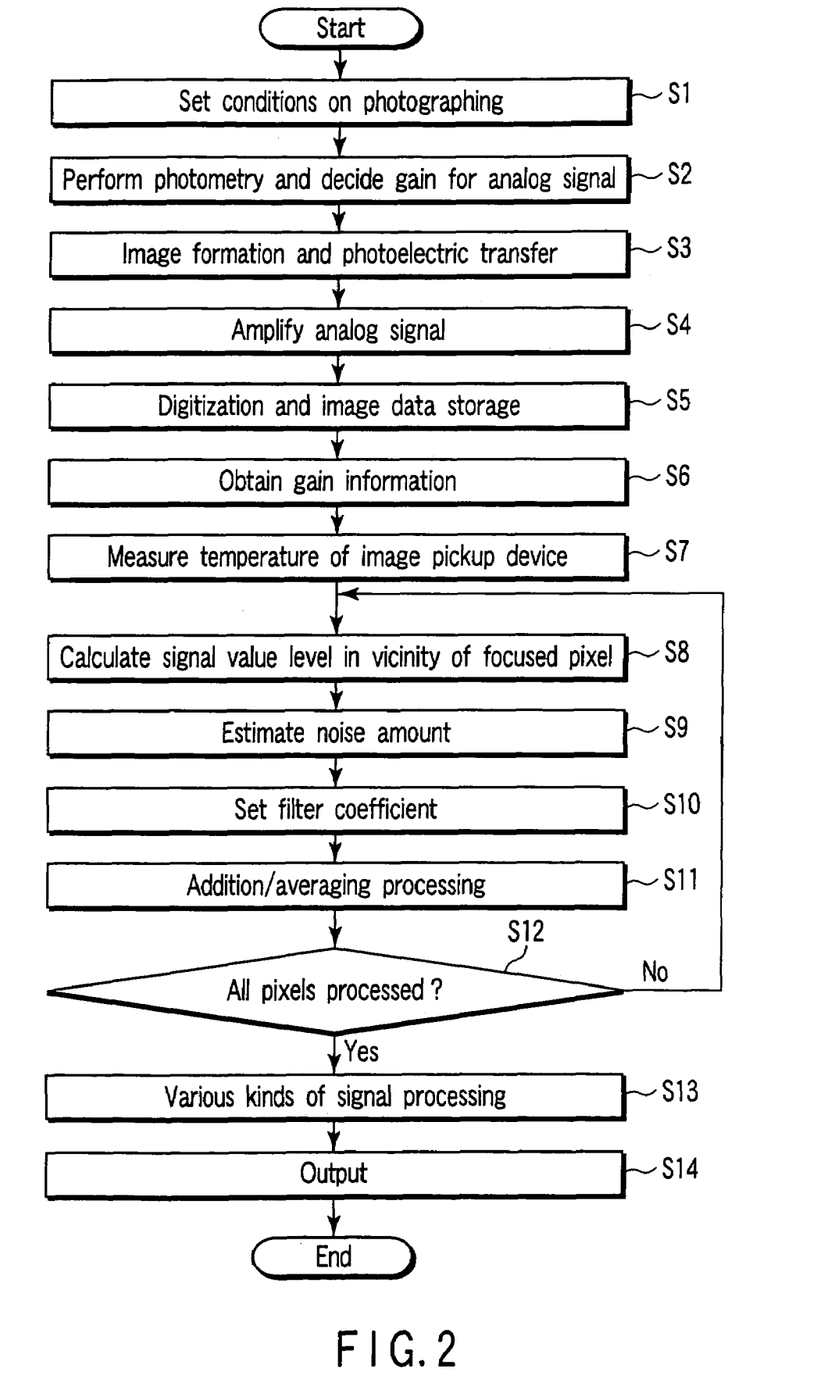
FIG. 2 is a diagram showing a flow of processing in the noise reduction apparatus according to the first embodiment.

FIG. 2 is a diagram showing a flow of processing in the noise reduction apparatus according to the first embodiment. Details will be described below properly referring to the configuration in FIG. 1.

First, in the photographic instrument, before a photographing operation, a user operates the external interface 110 to set conditions during photographing (step S1). The conditions in this case includes individual settings or auto settings such as the aperture, the shutter speed, an exposure, the ISO film speed, a flash, a white balance, a focus and the scene to be imaged, and setting of a recorded image format. After setting these conditions, the subject is placed into an angle of field, and a shutter button is pressed halfway. Then, the photometric evaluation unit 107 performs photometry for the external light, and decides a gain for the analog signal considering the above-mentioned conditions (step S2). It is to be noted that some photographic instruments are configured to obtain a digital image via a route conforming to an actual photographing described later and decide the gain on the basis of this digital image.

If the shutter button which has been pressed halfway is completely pressed, the actual photographing is performed. The image of the subject formed through the optical system 101 is converted into the electric signal by the image pickup device 102 (step S3), and sent to the signal amplification unit

103. The signal amplification unit 103 amplifies the analog signal in accordance with the gain decided in the photometric evaluation unit 107 (step S4).

When the exposure and the ISO film speed are set high, the gain is naturally large. Some apparatuses are configured to simultaneously achieve the white balance by applying different gain to a signal of each colored filter.

Figure 3:
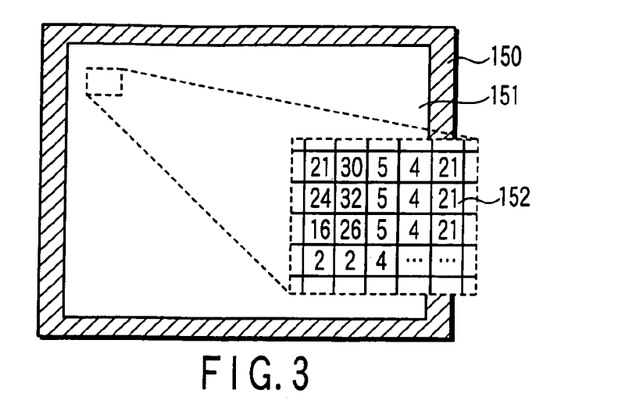
FIG. 3 is a diagram showing a two-dimensional array of data from an image pickup device.

The amplified analog signal is converted into a digital signal in the analog-to-digital converter 104, and the digital signal is stored in the image memory 105 to perform the various kinds of subsequent signal processing (step S5). Here, the stored digital signal can be regarded as a two-dimensional array of data of a predetermined size as shown in FIG. 3, and has a signal value 152 of an optional pixel in a pixel area 151. It is to be noted that a peripheral part of this two-dimensional array of data also includes an area 150 comprising pixels indicating a dark current level generally called an optical black (OB), and this OB level is used as a zero level to calculate the signal values of the respective pixels.

Figure 4:
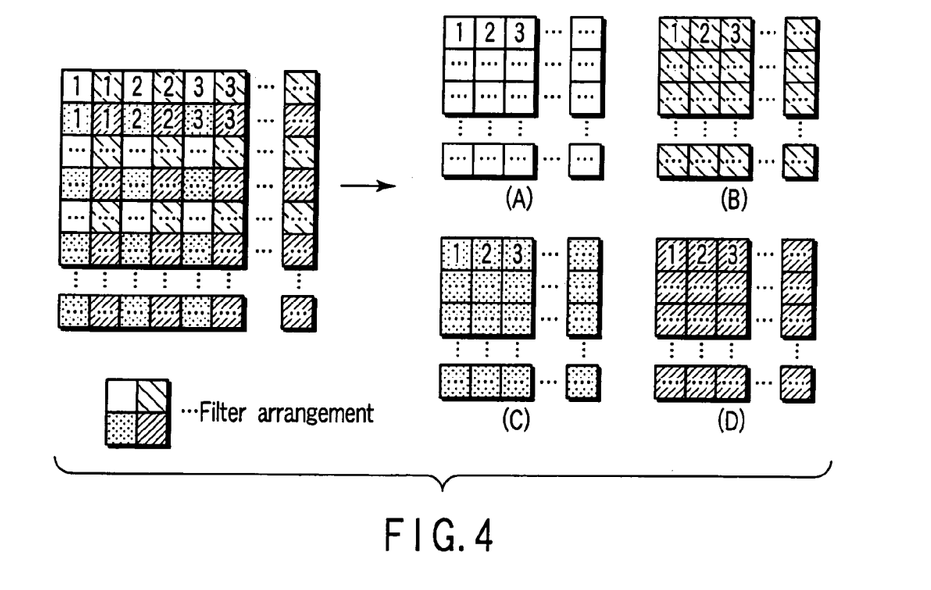
FIG. 4 is a diagram showing an example of division of single plate imaging data into identical color data.

In a photographic instrument in which there are different image pickup devices for a plurality of colored filters, the two-dimensional array of data (hereinafter written as image data) can be obtained for each of the colored filters. Moreover, in a photographic instrument in which one sheet of image pickup device and a plurality of colored filters are arranged in a tessellated form, an obtained signal is resampled in accordance with the arrangement of the colored filters, so that the signal can be divided into image data (A) to (D) for the respective colored filters as shown in FIG. 4.

Subsequent processing steps S7 to S12 concerns processing of the image data for the respective colored filters. Thus, in the photographic instrument in which there are a plurality of colored filters, similar processing is performed for the respective colored filters.

The gain information obtaining section 1082 in the noise amount estimating unit 108 obtains gain information decided in the photometric evaluation unit 107 (step S6), and the temperature measuring section 1083 measures a temperature of the image pickup device using a temperature sensor (not shown) disposed in the vicinity of the image pickup device (step S7). Next, the signal value level calculating section 1081 in the noise amount estimating unit 108 calculates a signal value level for an optional focused pixel in the image data (step S8). While there are various methods of calculating the signal value level, the following methods will be shown by way of example.

The signal value of the focused pixel is used as the signal value level.

Figure 5:
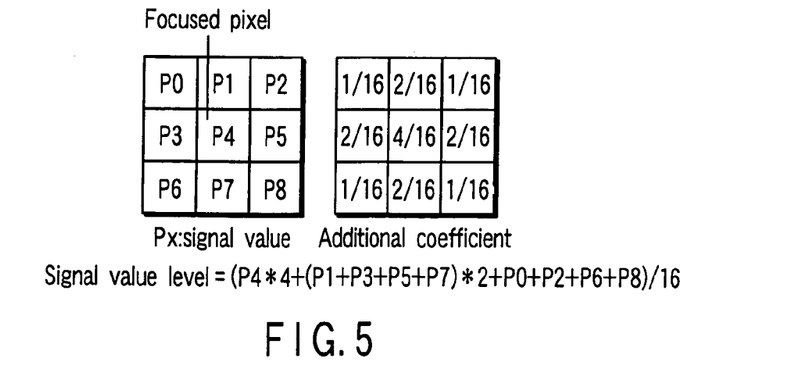
FIG. 5 is a diagram showing an example of calculating a signal value level (No. 1)

An additional/average value of the signal values of the focused pixel and neighboring pixels thereof is used as the signal value level. FIG. 5 shows one example thereof, wherein the additional/average value is obtained in such a manner that a value obtained by multiplying the signal values of the respective signals by a predetermined additional coefficient is added. That is, the signal value level=(P4*4+(P1+P3+P5+P7)*2+P0+P2+P6+P8)/16.

Figure 6:
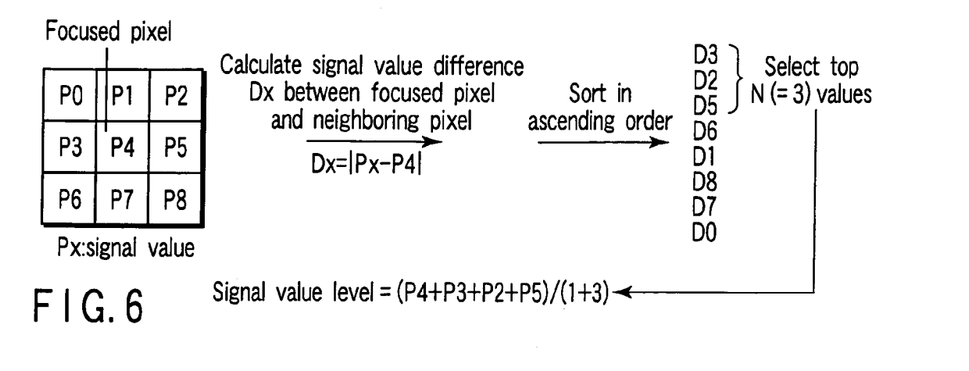
FIG. 6 is a diagram showing an example of calculating the signal value level (No. 2)

As the signal value level, there is defined an average value of the focused pixel and top N pixels which are a little different in signal values from the focused pixel among the neighboring pixels of the focused pixel. FIG. 6 shows one example thereof, wherein absolute values Dx of differences between a signal value P4 of the focused pixel and signal values Px of the respective neighboring pixels are calculated, and the absolute values are sorted in ascending order, thereby selecting signal values P3, P2 and P5 of the neighboring pixels corresponding to top three values D3, D2 and D5. Then, an average value of the signal value P4 of the focused pixel and the signal values P3, P2 and P5 of the neighboring pixels is calculated. That is, the signal value level=(P4+P3+P2+P5)/(1+3).

Figure 7:
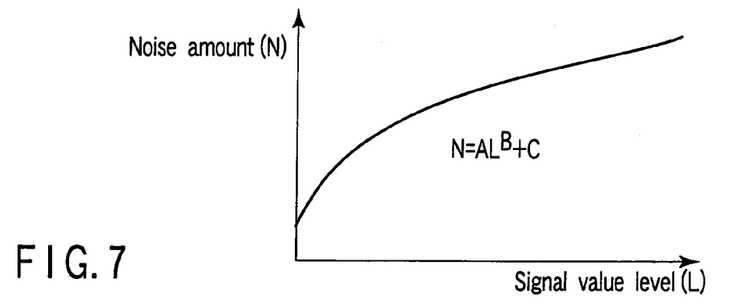
FIG. 7 is a diagram showing a relation of a noise quantizer with the signal value level.

Subsequently, the signal value levels for the gain, the temperature of the image pickup device and the focused pixel are obtained, and then the noise amount estimating unit 108 estimates the noise amount in the focused pixel (step S9). A method of estimation includes obtaining the noise amount by formulating it as a function of each of the above-mentioned values. FIG. 7 is a graph in which the noise amount is plotted relative to the signal value level. Here, the noise amount is expressed as an addition of a constant term to a function of the power of the signal value level:

$$N = A \times L^B + C \quad A, B, C: \text{arbitrary constants} \qquad \text{(Equation 1)}$$

wherein L is the signal value level, and N is the noise amount. Here, A, B, C are arbitrary constants, but they actually change with a temperature T of the device and a gain G.

Figure 8:
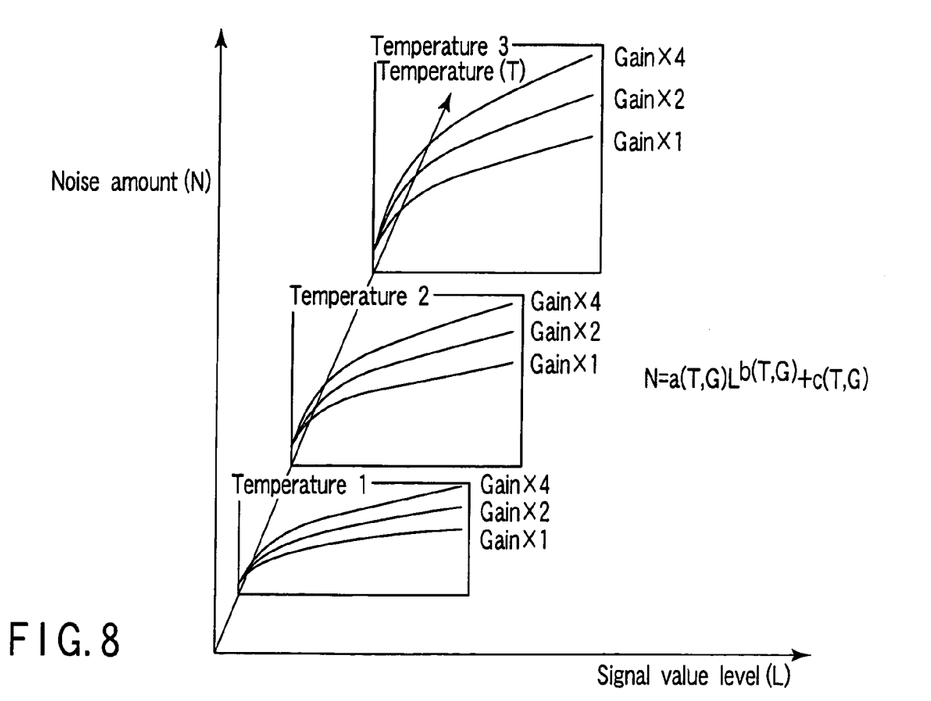
FIG. 8 is a diagram showing a relation of a noise amount with gains, temperatures and the signal value level.

FIG. 8 is a graph in which the noise amount is plotted relative to the signal value level, temperatures and gains. Individual curves are in a form shown in (Equation 1), but their coefficients change with the temperature T and the gain G. Therefore, the above is considered to formulate the noise amount:

$$N = a(T,G) \times L^{b(T,G)} + c(T,G) \qquad \text{(Equation 2)}.$$

In (Equation 2), functions of a( ), b( ), c( ) can be easily obtained by measuring a characteristic of a device system in advance.

Thus, the noise amount estimating unit 108 maintains the information on the memory, so that it is possible to arithmetically obtain the noise amount using the temperature T, the gain G and a signal value level L obtained in steps S7, S8.

In the present embodiment, the power function relative to the signal value level has been taken as an example. However, it is also possible to conceive a method of expressing the noise amount by a combination of linear functions or obtaining the noise amount by use of a lookup table without formulating the noise amount. Moreover, the temperature T and the gain G do not always need to be obtained every time the photographing is performed. For example, since the temperature T is stabilized after a given period of time has passed from the time when power had been turned on, temperature information which has been once calculated can be recorded on the memory and used in subsequent calculation.

After the noise amount for the focused pixel is estimated, the coefficient setting section 1091 in the control unit 109 sets a filter coefficient for use in smoothing (step S10). A filter coefficient K is individually set for each neighboring pixel x except for the focused pixel.

Equation 3 below is one example of an equation to calculate a filter coefficient Kx.

$$Kx = W \times N / \Delta Lx \quad x \in \text{neighboring pixel} \qquad \text{(Equation 3)}$$

Figure 9:
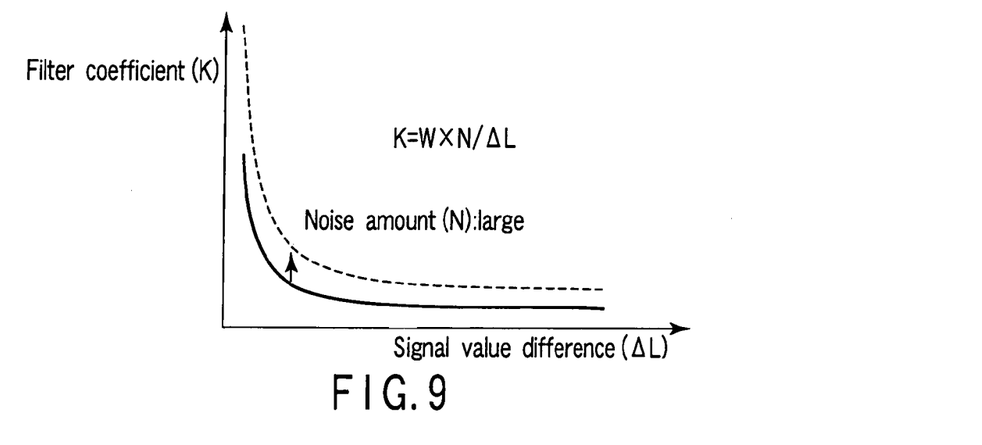
FIG. 9 is a diagram showing a relation of a filter coefficient with the noise amount and a signal value difference.

In (Equation 3), W is a constant (positive), N is the noise amount, and $\Delta Lx$ is a signal value difference (positive) between the focused pixel and the neighboring pixel x. Further, a coefficient Kx is an increasing function for the noise amount N, and a decreasing function for the signal value difference $\Delta Lx$ between the focused pixel and the neighboring pixel (see FIG. 9). The reason for this will be described later. After setting the coefficient, the filtering section 1061 in the smoothing unit 106 performs addition/averaging processing (step S11) shown in (Equation 4), and creates a smoothed image wherein a new signal value Pt' obtained by adding/ averaging a signal value Pt of the focused pixel and a signal value Px of the neighboring pixel is defined as a signal value at a position of the focused pixel.

$$Pt' = \frac{\sum (Kx \times Px) + Pt}{\sum (Kx) + 1} \quad x \in \text{neighboring pixel} \quad \text{(Equation 4)}$$

In (Equation 4), Pt': a signal value of the focused pixel after addition/averaging Kx: a filter coefficient for each neighboring pixel Px: a signal value of the neighboring pixel Pt: a signal value of the focused pixel Kx is the increasing function for the noise amount, so that when the noise amount has increased, an addition rate of the neighboring pixel to the focused pixel during the addition/averaging rises. As a result, the image is more blurred.

Figure 10:
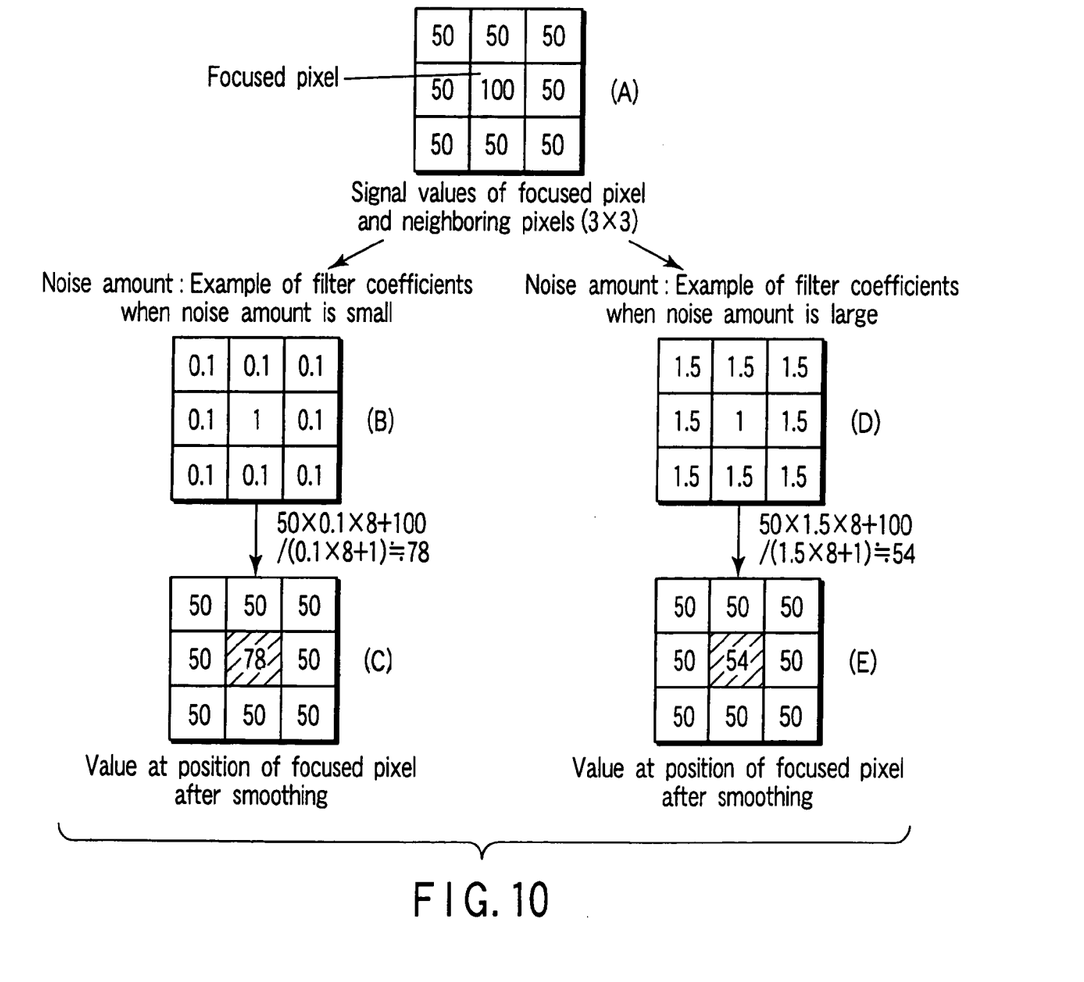
FIG. 10 is a diagram showing how a result of smoothing processing varies depending on a difference in estimated noise amounts.

FIG. 10 is a diagram showing how a result of smoothing processing varies depending on a difference of the noise amounts. In other words, a higher degree of smoothing is achieved and a smooth state is obtained in a place with a higher noise amount. Thus, noise reduction corresponding to the noise amount is achieved. On the other hand, since Kx is the decreasing function for the signal value difference between the focused pixel and the neighboring pixel, the addition rate is lower in a pixel with a larger signal value difference.

Figure 11:
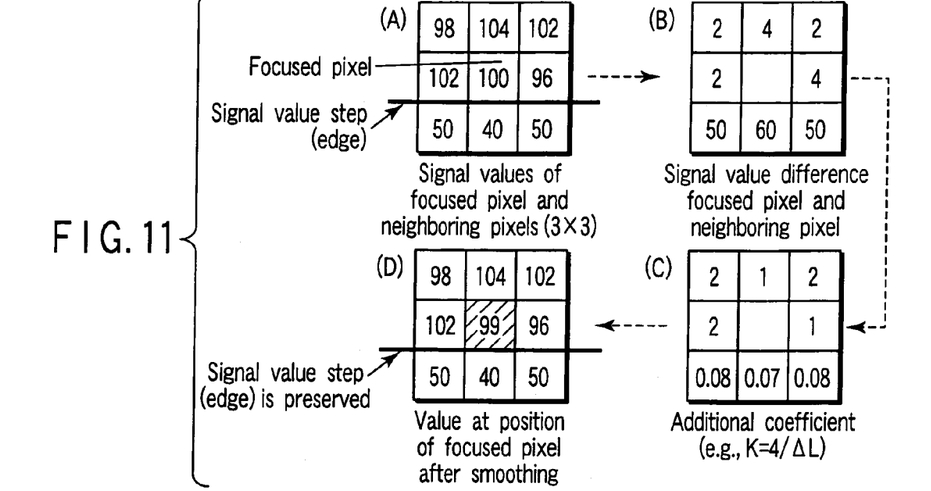
FIG. 11 is a diagram showing how the result of the smoothing processing varies depending on a difference in signal values between a focused pixel and neighboring pixels.

Therefore, as shown in (A) to (D) in FIG. 11, since the focused pixel is smoothed using much information on the neighboring pixels whose signal values are on the same level as that of the focused pixel, noise reduction can be performed while favorably preserving original image information such as edge information. It is to be noted that changes only in the position of the focused pixel are shown in FIGS. 10 and 11, but actually, individual neighboring pixels are smoothed in a similar manner and will have new values. However, the same effects remain unchanged in that the smoothing is performed in a manner corresponding to the noise amount and that the smoothing is performed in such a manner as to preserve edges.

Processing steps ranging from step S8 to S11 are performed for an optional focused pixel, and a new value at the position of the pixel is obtained, and then the control unit 109 judges whether all the pixels have been processed (step S12). When a negative judgment is made, steps from step S8 to S11 are repeated, and all the pixels are smoothed by addition/averaging. Subsequently, various kinds of signal processing are performed (step S13), and a result is output (step S14), thereby ending the processing in the photographic instrument.

In the present embodiment, a rectangular 3×3 area around the focused pixel has been shown as the neighboring pixels, but a size and shape of the area should not be limited thereto and may be decided in conjunction with the noise amount. Further, the noise amount and the signal value difference are used to set the filter coefficient in the present embodiment, but the coefficient may be set additionally considering a distance from the focused pixel. In that case, the coefficient is the decreasing function associated with the distance, but should preferably be set so that a particular frequency is not extremely attenuated in a frequency space.

As described above, according to the first embodiment of the present invention, the noise amount is estimated on a pixel to pixel basis from the signal value level, the temperature of the image pickup device and the gain information, and the addition/averaging processing is performed by use of the noise amount and of the filter coefficient corresponding to the signal value difference between the focused pixel and the neighboring pixels, thereby enabling the noise reduction with a high preserving quality of an original signal.

Second Embodiment

Figure 12:
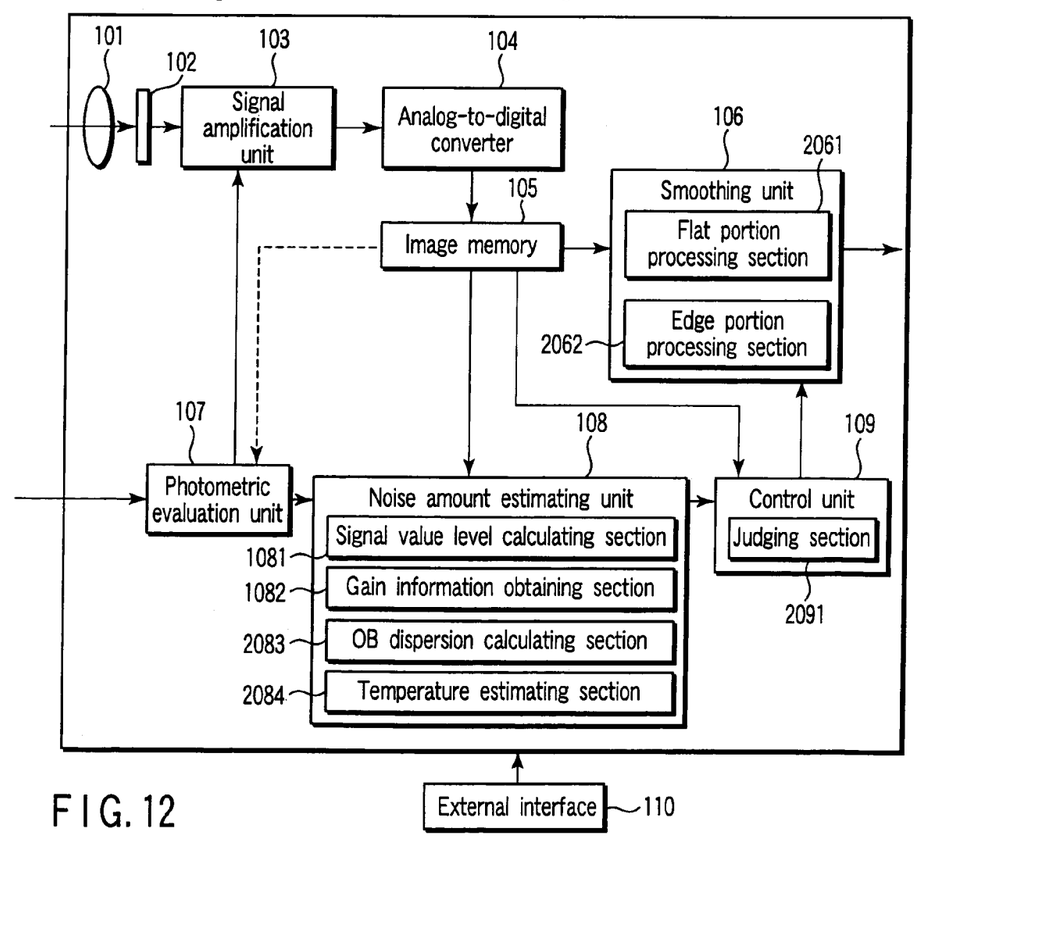
FIG. 12 is a diagram showing a configuration of a noise reduction apparatus according to a second embodiment of the present invention.

FIG. 12 is a diagram showing a configuration of a noise reduction apparatus according to a second embodiment of the present invention. In the noise reduction apparatus of the second embodiment, a noise amount estimating unit 108, in contrast with that in the first embodiment, does not comprise a temperature measuring section 1083 which measures a temperature of an image pickup device, and the noise amount estimating unit 108 comprises a dispersion calculating section 2083 which obtains dispersion of an optical black (OB) area, and a temperature estimating section 2084 which estimates a temperature of the image pickup device from a value of the dispersion. Further, a control unit 109, in contrast with that in the first embodiment, does not comprise a coefficient setting section 1091 which sets a coefficient for smoothing, and the control unit 109 comprises a judging section 2091 which judges whether an area in the vicinity of the focused pixel is a flat portion or an edge portion. Moreover, a smoothing unit 106, in contrast with that in the first embodiment, does not comprise a filtering section 1061, and comprises a flat portion processing section 2061 and an edge portion processing section 2062. Other parts are configured in the same manner as in the first embodiment, and the same names and numbers are assigned thereto.

Figure 13:
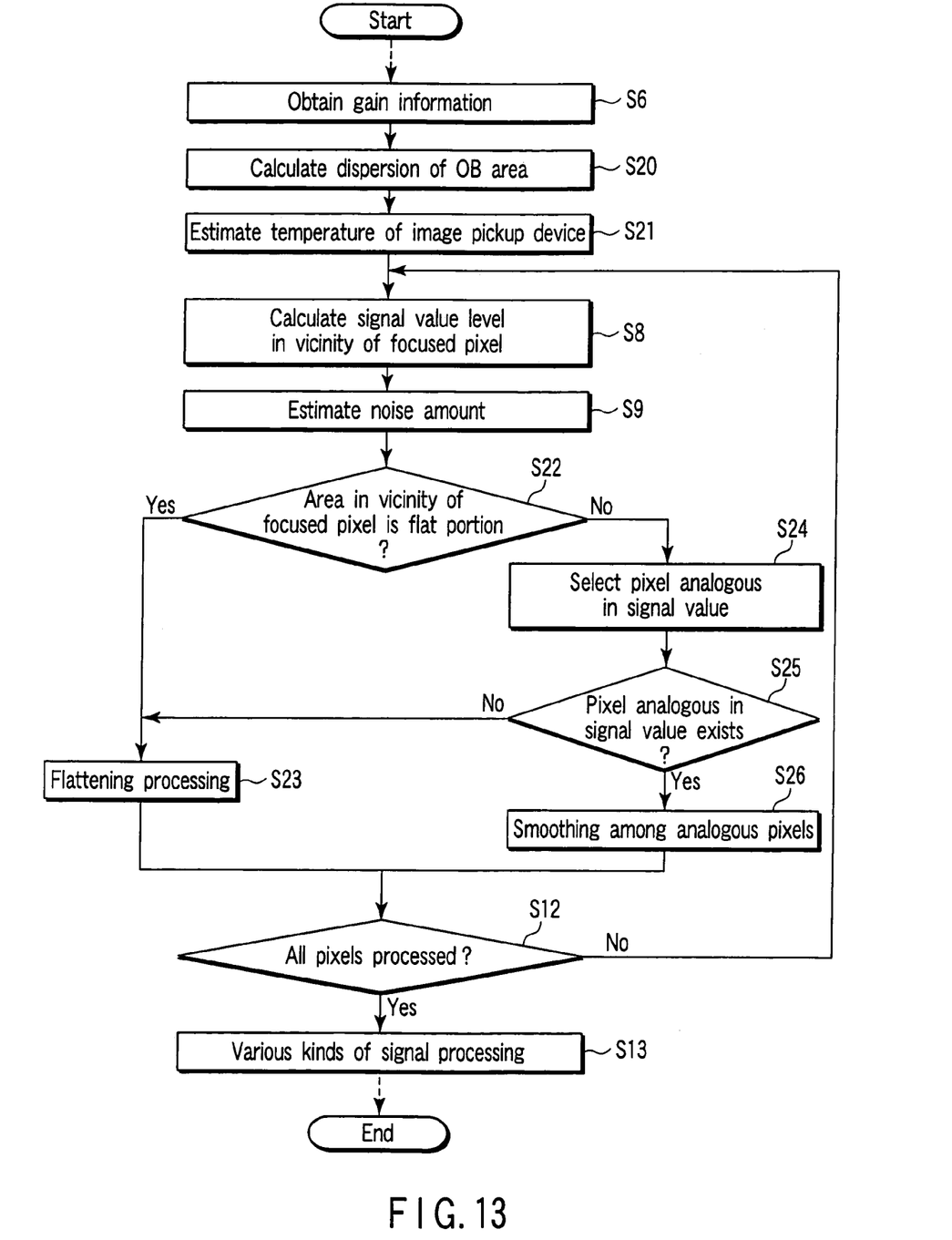
FIG. 13 is a diagram showing a flow of processing in the noise reduction apparatus according to the second embodiment.

FIG. 13 is a diagram showing a flow of processing in the noise reduction apparatus according to the second embodiment. Details will be given below properly referring to the configuration in FIG. 12. It is to be noted that parts common to the first and second embodiments are not shown and described.

In the second embodiment, after image data in actual photographing has been stored and a gain information obtaining section 1082 has obtained gain information decided in a photometric evaluation unit 107, the OB dispersion calculating section 2083 reads a value of the optical black (OB) area, and calculates a dispersion value (step S20). Then, the temperature estimating section 2084 estimates the temperature of the image pickup device on the basis of a memory in which a relation between the dispersion value and a temperature T of the image pickup device is recorded (step S21).

Figure 14:
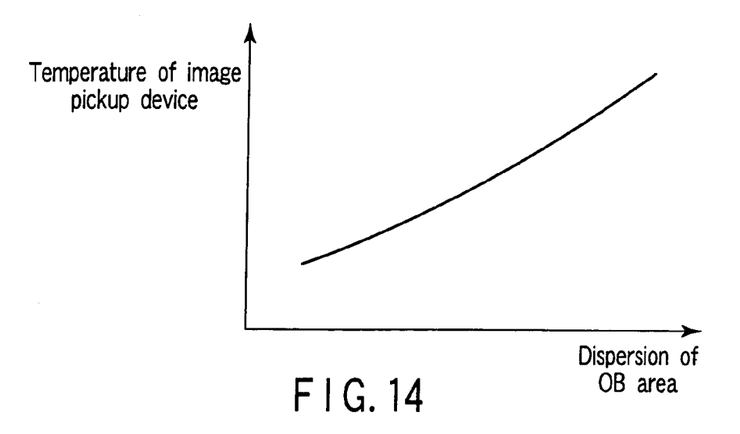
FIG. 14 is a diagram showing a relation between dispersion of an OB area and a temperature of the image pickup device.

FIG. 14 is a diagram showing a relation between dispersion of the OB area and the temperature of the device, wherein the temperature of the image pickup device rises as the dispersion of the OB area increases. Noise in the OB area without incident light is predominantly dark current noise, and this is associated with the temperature of the device. Therefore, noise of the OB area is calculated as the dispersion value, and the dispersion value relative to the change in the temperature of the device is measured in advance, thereby allowing the temperature T of the device to be estimated from the dispersion value.

It is to be noted that by use of the OB areas existing in all directions (see FIG. 3), the dispersion value for the focused pixel may be obtained by linear interpolation from the dispersion values of the OB areas at an upper edge, lower edge, left edge and right edge with respect to the focused pixel. In this way, highly accurate temperature estimation can be achieved even when the temperature of the device is irregular. After a gain G and the device temperature T are obtained, a signal value level in the vicinity of the focused pixel is calculated (step S8), and a noise amount is estimated (step S9) as in the first embodiment.

After the noise amount is estimated, the judging section 2091 judges whether the area in the vicinity of the focused pixel is the flat portion or the edge portion on the basis of an obtained noise amount N and information on the pixels in the vicinity of the focused pixel (step S2). There are judging methods as follows:

A difference L_max−L_min between a maximum signal value L_max and a minimum signal value L_min among the neighboring pixels is compared with a threshold value Threshold=α1×N (α1: coefficient) calculated on a noise amount N. If the difference surpasses the threshold value, the area is judged to be the edge portion.

A dispersion σ in a neighboring pixel is compared with a threshold value Threshold=α2×N (α2: coefficient) calculated on the noise amount N. If the dispersion surpasses the threshold value, the area is judged to be the edge portion.

When the area is judged to be the flat portion, the flat portion processing section 2061 flattens the focused pixel. Actually, a value of the focused pixel is replaced with an additional/average value in the neighboring pixels. On the other hand, when the area is judged to be the edge portion, the edge portion processing section 2062 first selects the neighboring pixel (=a pixel analogous in the signal value) having a signal value on the same level as that of the focused pixel (step S24).

This can be achieved in such a manner that a signal value difference ΔL (positive) between the focused pixel and the neighboring pixel is compared with a threshold value Threshold=β×N (β: coefficient) calculated on the noise amount N, and if the signal value difference is within the threshold value, the pixel is regarded as the pixel analogous in the signal value. After all the neighboring pixels are processed in the same manner, the edge portion processing section 2062 checks the number of the pixels having the analogous signal value (step S25). When there is no analogous pixel among the neighboring pixels, it is highly likely that the focused pixel is spike-shaped noise. Thus, in this case, the value of the focused pixel is replaced with the additional/average value in all the neighboring pixels as in a case where the area is judged to be the flat portion. When the pixels having the analogous signal value exist, the edge portion processing section 2062 replaces the value of the focused pixel with the additional/average value of the pixels having the analogous signal value (step S26). Thus, edge components contained in an original signal are preserved. After the processing described above has been performed for all the pixels, the processing is terminated with a step after step S13 of the first embodiment.

As described above, according to the second embodiment of the present invention, the temperature of the image pickup device is estimated on the basis of the data on the OB area, so that the temperature measuring section is not necessary and costs can therefore be reduced. Further, the noise amount is estimated on a pixel to pixel basis from the signal value level, the temperature of the image pickup device and the gain information, and the area is judged to be the flat portion or the edge portion in accordance with the noise amount and information on the focused pixel and the neighboring pixels so that different processing is performed for each portion, thereby enabling the noise reduction with a high preserving quality of the original signal.

Third Embodiment

Figure 15:
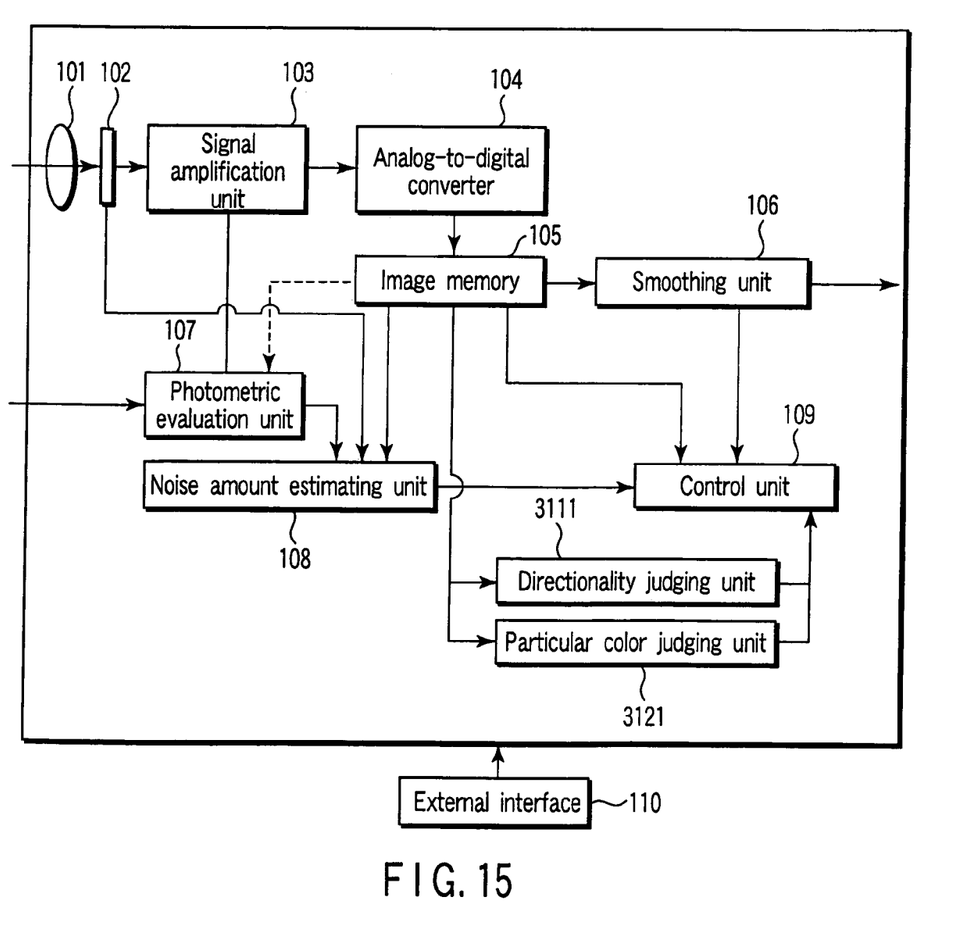
FIG. 15 is a diagram showing a configuration of a noise reduction apparatus according to a third embodiment of the present invention.

FIG. 15 is a diagram showing a configuration of a noise reduction apparatus according to a third embodiment of the present invention. The noise reduction apparatus according to the third embodiment comprises a directionality judging unit 3111 and a particular color judging unit 3121, in addition to the configuration of the noise reduction apparatus in the first or second embodiment.

In the third embodiment, the directionality judging unit 3111 judges a level of directionality in the vicinity of a focused pixel using image data in actual photographing. A procedure will be shown below in (1) to (6) to judge the level of directionality using a signal value of a 3×3 pixels in the vicinity of the focused pixel shown in FIG. 5.

(1) First, a directional index E1 in a vertical direction is obtained by (Equation 5) as follows:

$$E1 = \frac{|ave1 - ave2|}{std1 + std2} + \frac{|ave2 - ave3|}{std2 + std3} \quad \text{(Equation 5)}$$

In (Equation 5),
ave1: an average signal value of P0, P3, P6
ave2: an average signal value of P1, P4, P7
ave3: an average signal value of P2, P5, P8
std1: standard deviation of P0, P3, P6
std2: standard deviation of P1, P4, P7
std3: standard deviation of P2, P5, P8.

(2) Next, a directional index E2 in a horizontal direction is obtained by (Equation 6) as follows:

$$E2 = \frac{|ave4 - ave5|}{std4 + std5} + \frac{|ave5 - ave6|}{std5 + std6} \quad \text{(Equation 6)}$$

In (Equation 6),
ave4: an average signal value of P0, P1, P2
ave5: an average signal value of P3, P4, P5
ave6: an average signal value of P6, P7, P8
std4: standard deviation of P0, P1, P2
std5: standard deviation of P3, P4, P5
std6: standard deviation of P6, P7, P8.

(3) Next, a directional index E3 in an oblique direction (down to the right) is obtained by (Equation 7) as follows:

$$E3 = \frac{|ave7 - ave8|}{std7 + std8} + \frac{|ave8 - ave9|}{std8 + std9} \quad \text{(Equation 7)}$$

In (Equation 7),
ave7: an average signal value of P1, P5
ave8: an average signal of P0, P4, P8
ave9: an average signal value of P3, P7
std7: standard deviation of P1, P5
std8: standard deviation of P0, P4, P8
std9: standard deviation of P3, P7.

(4) Next, a directional index E4 in an oblique direction (up to the right) is obtained by (Equation 8) as follows:

$$E4 = \frac{|ave10 - ave11|}{std10 + std11} + \frac{|ave11 - ave12|}{std11 + std12} \quad \text{(Equation 8)}$$

In (Equation 8),
ave10: an average signal value of P1, P3
ave11: an average signal of P2, P4, P6
ave12: an average signal value of P5, P7
std10: standard deviation of P1, P3
std11: standard deviation of P2, P4, P6
std12: standard deviation of P5, P7.

(5) A maximum value E_max for the obtained directional indices E1 to E4 are obtained.

(6) Next, E_max is compared with a threshold value Threshold, and if E_max is above the threshold value, it is judged to have a high directionality. It is to be noted that the threshold value Threshold may be a preset fixed value, or may be such that Threshold=$\gamma^N$ ($\gamma$: coefficient, N: noise amount (a method of calculating this is similar to that in the first embodiment)).

When the directionality is judged to be high in this manner, the directionality judging unit 3111 sends obtained information on the directionality (such as the E_max value) to the control unit 109.

Furthermore, the particular color judging unit 3121 temporarily obtains signal values of all colored filters in the vicinity of the focused pixel from an image memory 105, and finds a color in the focused pixel on the basis of the signal values. It is to be noted that in a photographic instrument configured such that the colored filters are arranged in a tessellated form, a signal value for only one colored filter can be obtained in a position of the focused pixel. Thus, in this case, the signal values of other colored filters are calculated by linearly interpolating the signal values of similar filters in neighboring pixels.

After having found information on a color, the particular color judging unit 3121 judges whether the found color is a particular color (e.g., sky color, skin color, hair color), and sends the color information to the control unit 109 when the found color corresponds to the particular color. The control unit 109 controls a degree of noise reduction on the basis of the directionality information and the color information. For example, the control unit 109 decreases the degree of noise reduction to preserve an original signal when the directionality is high, or increases the degree of noise reduction for smoothing when the color is sky color or skin color. For example, it is also possible to conceive a control method wherein a structure and the color are integrally judged, and the degree of noise reduction is decreased when the color is hair color and the directionality is high.

As described above, according to the third embodiment of the present invention, the degree of noise reduction is controlled on the basis of the information on the texture and color in the vicinity of the focused pixel, thereby enabling the noise reduction better suited to human sensitivity.

What is claimed is:

1. A noise reduction apparatus comprising:
   a noise amount estimating unit which estimates a noise amount in a focused pixel;
   a smoothing unit which smoothes the focused pixel; and
   a control unit which controls the smoothing unit on the basis of the noise amount and information on the focused pixel and neighboring pixels thereof.

2. The noise reduction apparatus according to claim 1, wherein the smoothing unit has a filtering section which adds/averages signal values of the focused pixel and the neighboring pixels, and the control unit has a coefficient setting section which sets a filter coefficient for use in the filtering section on the basis of the noise amount and a signal value difference between the focused pixel and the neighboring pixels.

3. The noise reduction apparatus according to claim 2, wherein the coefficient setting section has a coefficient calculator which calculates the filter coefficient for the neighboring pixels except for the focused pixel as an increasing function relative to the noise amount.

4. The noise reduction apparatus according to claim 2, wherein the coefficient setting section has a coefficient calculator which calculates the filter coefficient for the neighboring pixels except for the focused pixel as a decreasing function relative to the signal value difference between the focused pixel and the neighboring pixels.

5. The noise reduction apparatus according to claim 1, wherein the control unit has a judging section which judges whether an area in the vicinity of the focused pixel is a flat portion or an edge portion on the basis of the noise amount, and the smoothing unit has a flat portion processing section which performs processing when the area in the vicinity of the focused pixel is judged to be the flat portion by the judging section, and an edge portion processing section which performs processing when the area in the vicinity of the focused pixel is judged to be the edge portion by the judging section.

6. The noise reduction apparatus according to claim 5, wherein the edge portion processing section has an analogous pixel detector which detects the neighboring pixel whose signal value is analogous to that of the focused pixel on the basis of the noise amount, and an inter-analogous-pixel processor which performs processing by use of the signal values of the analogous pixel and the focused pixel.

7. The noise reduction apparatus according to claim 1, wherein the noise amount estimating unit has a signal value level calculating section which calculates a signal value level for noise estimation in the focused pixel by use of the signal values of the focused pixel and the neighboring pixels thereof.

8. The noise reduction apparatus according to claim 7, wherein the noise amount estimating unit has a temperature measuring section which measures a temperature of an image pickup device, and uses the temperature of the image pickup device to calculate the signal value level for noise estimation in the focused pixel.

9. The noise reduction apparatus according to claim 7, wherein the noise amount estimating unit has an OB dispersion calculating section which obtains dispersion of signals of an optical black (OB) area within the image pickup device, and a temperature estimating section which estimates the temperature of the image pickup device from the dispersion, and the noise amount estimating unit uses the estimated temperature of the image pickup device to calculate the signal value level for noise estimation in the focused pixel.

10. The noise reduction apparatus according to claim 7, wherein the noise amount estimating unit has a gain information obtaining section which obtain gain information relative to an imaging signal, and uses the gain information to calculate the signal value level for noise estimation in the focused pixel.

11. The noise reduction apparatus according to claim 1, further comprising a directionality judging unit which judges a level of directionality in the vicinity of the focused pixel, wherein the control unit further controls the smoothing unit on the basis of the level of directionality.

12. The noise reduction apparatus according to claim 1, further comprising a particular color judging unit which judges whether or not the area in the vicinity of the focused pixel has a particular color, and the control unit further controls the smoothing unit on the basis of information on the particular color.

* * * * *